UNITED STATES PATENT OFFICE.

FRANK C. COOK, OF WASHINGTON, DISTRICT OF COLUMBIA.

SPRAY.

1,384,304.   Specification of Letters Patent.   Patented July 12, 1921.

No Drawing.   Application filed December 15, 1920.   Serial No. 431,044.

(FILED UNDER THE ACT OF MARCH 3, 1883, 22 STAT. L., 625.)

*To all whom it may concern:*

Be it known that I, FRANK C. COOK, a citizen of the United States of America, and an employee of the Department of Agriculture, residing in Washington, District of Columbia, (whose post-office address is Department of Agriculture, Washington, D. C.,) have invented a new and useful Spray.

This application is made under the act of March 3, 1883, chapter 143 (22 Stat., 625), and the invention herein described and claimed may be used by the Government of the United States, its officers and employees, and by any person in the United States without payment to me of any royalty thereon. I hereby dedicate the same to the free use of the Government and the people of the United States.

My invention relates to the use of various soluble barium salts and copper sulfate or other copper salts in the preparation of a spray, which functions like bordeaux and which may be used for all purposes and in all ways that bordeaux may be used, that is, as a liquid spray and as a dried product, alone and also combined with insecticides, spreaders and adhesives.

In ordinary bordeaux spray which is used universally to control fungous diseases on plants, vines, fruit, foliage, etc., a solution of sulfate of copper (blue vitriol or blue stone) is mixed with calcium hydroxid (milk of lime). To ordinary bordeaux prepared as noted above various insecticides and other substances are added to produce a combined fungicide and insecticide or to increase the adhesive or spreading properties or for other reasons.

I have prepared a spray by mixing solutions or sulfate of copper (blue stone or blue vitriol) and solutions of saturated or partly saturated barium hydroxid. Such a spray is known as barium water spray. The use of barium chlorid or any other soluble salt of barium in place of barium hydroxid is included in the preparation of a barium water spray. Also the preparation of a dry fungicide material made by drying the same material. I use this barium water-copper sulfate spray for all purposes for which ordinary or standard bordeaux may be used. The barium salt used has the advantage of dissolving completely in water, whereas in making sprays such as the Pickering sprays prepared from lime water and copper sulfate the clear lime water must be separated from the residue of lime, etc. Furthermore the barium salts have properties somewhat different from lime and lime salts. An added advantage in the use of barium water sprays over bordeaux is in the ease with which the sprays are pumped and the reduced wear and tear on the spray apparatus.

In the manufacture of my spray, solutions of copper sulfate of various strengths and of barium hydroxid or other soluble barium salts are diluted and poured together then thoroughly stirred. Equal parts of copper sulfate and barium hydroxid may be used and if free copper is shown by the test with potassium forrocyanid, then additional barium water should be added until no free copper is present. In addition to sprays prepared with just sufficient barium to neutralize the copper sulfate—sprays may be prepared using an excess of barium water. Dried spray material may also be prepared from the barium water sprays.

I claim:

1. A spray composed of a mixture of a solution of sulfate of copper and a solution of barium hydroxid.

2. As a new product a barium water spray consisting of a mixture of a solution of copper salt and a solution of barium salt.

In testimony whereof I affix my signature in the presence of two subscribing witnesses.

FRANK C. COOK.

Witnesses:
C. C. McDONNELL,
J. G. SHIBLEY.